United States Patent
Koch et al.

(10) Patent No.: US 6,179,099 B1
(45) Date of Patent: Jan. 30, 2001

(54) GAS SPRING HAVING AN INTERMEDIATE STOP FUNCTION AND TEMPERATURE COMPENSATION

(75) Inventors: Klaus Koch, Dahlheim; Rainer Sauer, Anschau; Oliver Schüttler, Monreal, all of (DE)

(73) Assignee: Stabilus GmbH, Koblenz (DE)

(*) Notice: Under 35 U.S.C. 154(b), the term of this patent shall be extended for 0 days.

(21) Appl. No.: 09/206,592

(22) Filed: Dec. 7, 1998

(30) Foreign Application Priority Data

Dec. 11, 1997 (DE) .............................................. 197 55 080

(51) Int. Cl.$^7$ ........................................................ F16F 9/52
(52) U.S. Cl. .......................... 188/277; 188/276; 188/317; 236/93 R
(58) Field of Search .................................. 188/277, 276, 188/278, 316, 322.19, 322.15, 322.13, 317; 16/52; 236/92 C, 93 R; 267/166, 170, 179, 277

(56) References Cited

U.S. PATENT DOCUMENTS

| | | | |
|---|---|---|---|
| 190,291 | * 5/1877 | Davis .................................. | 267/166 |
| 2,352,197 | * 6/1944 | Harvey ................................ | 188/277 |
| 3,791,494 | * 2/1974 | McNally .............................. | 188/277 |
| 4,162,064 | * 7/1979 | Bouton et al. ..................... | 267/177 |
| 4,433,759 | * 2/1984 | Ichinose .......................... | 188/322.15 |
| 4,585,099 | * 4/1986 | Taylor .............................. | 188/322.19 |
| 4,595,182 | 6/1986 | Freitag et al. .................... | 267/64.12 |
| 4,828,169 | * 5/1989 | Smith ................................ | 236/93 R |
| 5,106,065 | * 4/1992 | Staton et al. ........................ | 188/277 |
| 5,123,593 | * 6/1992 | Rundle ............................... | 236/93 B |
| 5,404,972 | 4/1995 | Popjoy et al. ....................... | 188/277 |
| 5,887,857 | * 3/1999 | Perrin .............................. | 188/322.19 |
| 5,967,268 | * 10/1999 | De Molina et al. ................. | 188/277 |

FOREIGN PATENT DOCUMENTS

| | | |
|---|---|---|
| 33 01 544 | 7/1984 | (DE) . |
| 44 21 773 | 10/1995 | (DE) . |
| 55-178714 | 12/1980 | (JP) . |
| 3-45183 | 11/1992 | (JP) . |
| 7-280016 | 10/1995 | (JP) . |
| WO 97/33 102 | 9/1997 | (WO) . |

\* cited by examiner

Primary Examiner—Matthew C. Graham
Assistant Examiner—Thomas J. Williams
(74) Attorney, Agent, or Firm—Baker Botts L.L.P.

(57) ABSTRACT

A gas spring includes a cylinder containing a fluid at least part of which is a compressed gas. The cylinder receives a piston that is affixed to a piston rod and divides the cylinder into two working chambers. The piston has a one-way valve that is cycled in response to the direction of motion of the piston and pressure-control valve consisting of a spring and a valve body. In a partial stroke region of the piston a bypass allows fluid flow past the one-way valve and the pressure-control valve. The partial stroke region is adjoined by a bypass-free stroke region, the gas spring being arrested in the bypass-free stroke region. The spring of the pressure-control valve has a temperature-dependent elastic force, the elastic force of the spring increasing with increasing operating temperature, owing to which the compressive force necessary for opening the pressure-control valve increases to an equal extent.

6 Claims, 4 Drawing Sheets

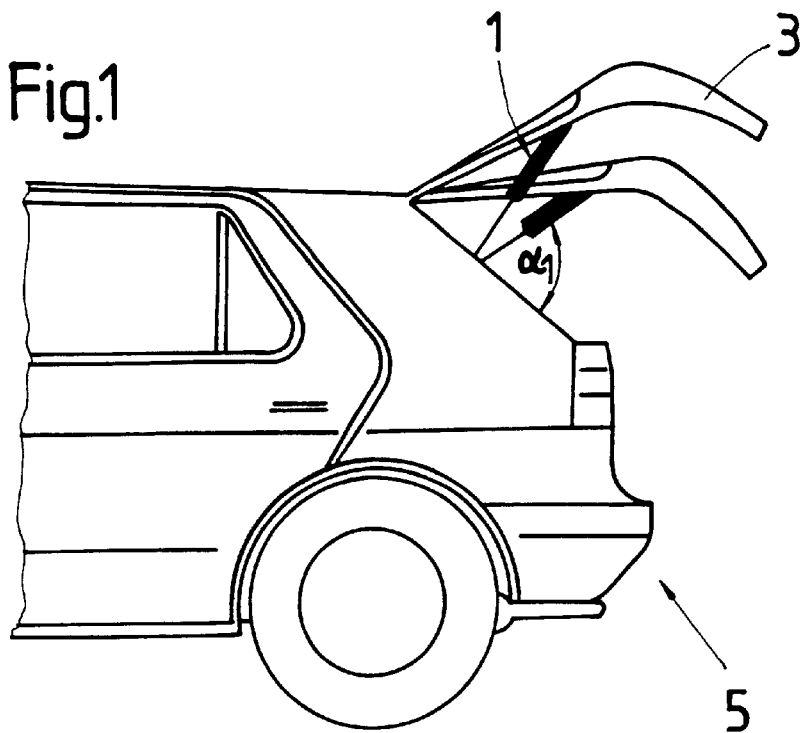
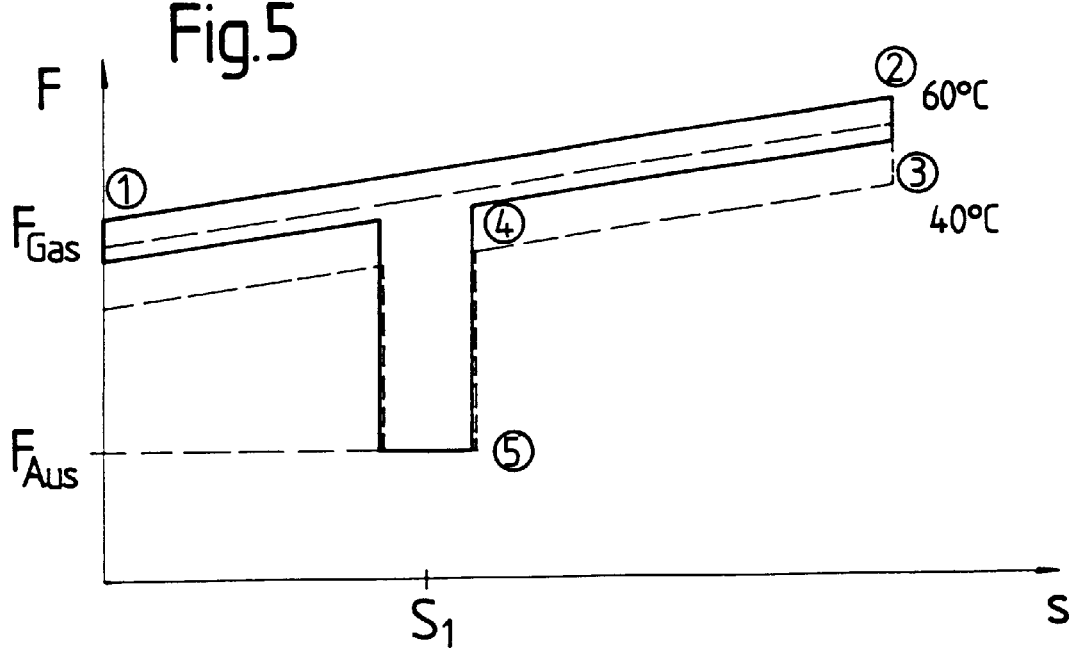

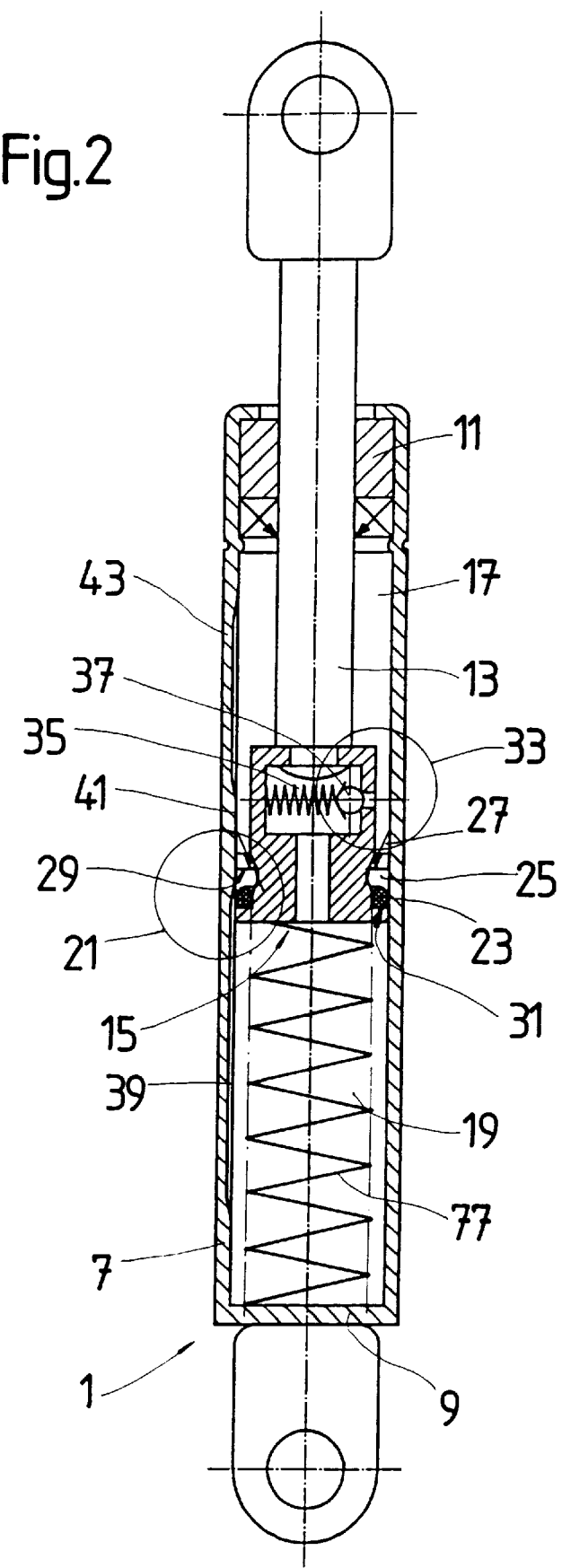

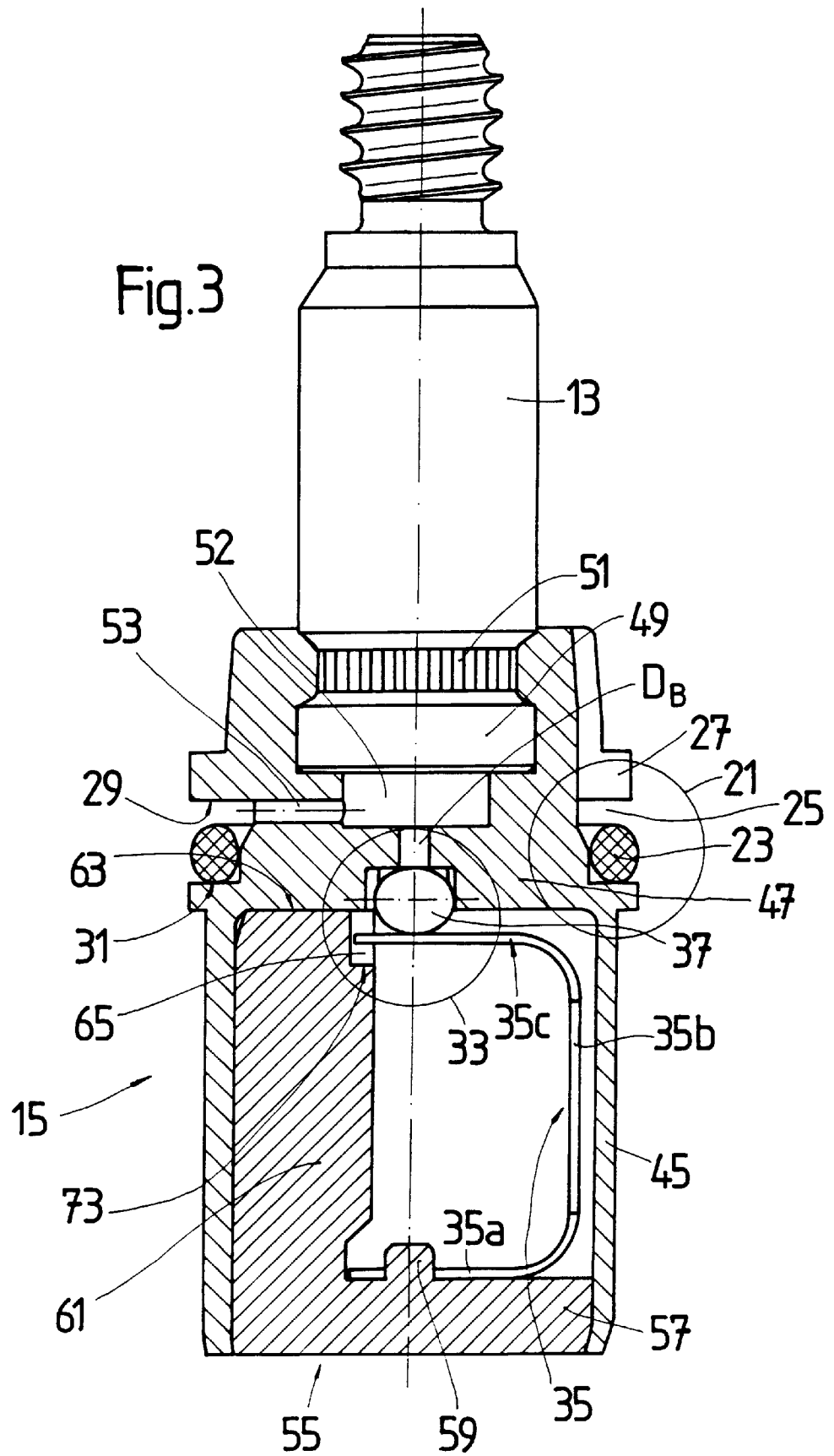

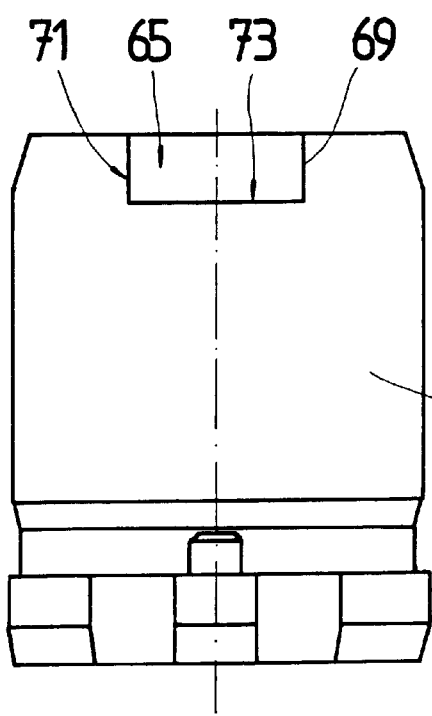
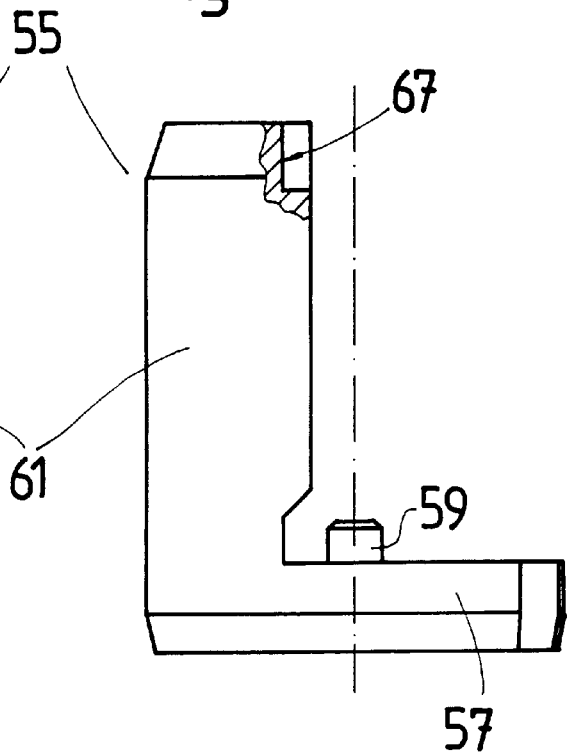
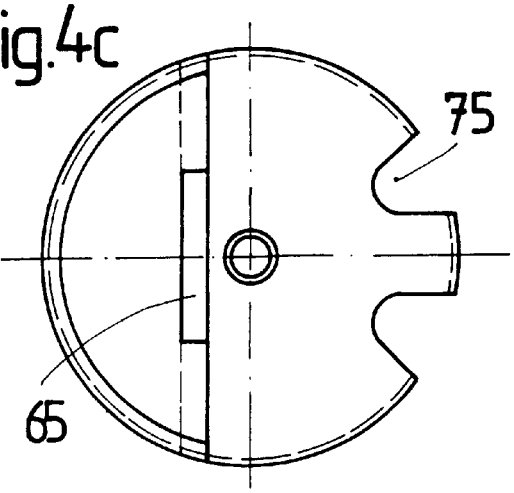

GAS SPRING HAVING AN INTERMEDIATE STOP FUNCTION AND TEMPERATURE COMPENSATION

BACKGROUND OF THE INVENTION

The present invention relates to a piston-cylinder unit suitable for use in, for example, a tailgate of a vehicle to open the tailgate upon operation of the unit through a partial extension stroke of the piston, stop the opening at the end of the partial stroke, and upon application of a manual force to the tailgate open the tailgate beyond the partial stroke.

DE 3,301,544 A1 discloses a piston-cylinder unit in the structural form of a gas spring, which is used for opening gates capable of swinging upward, for example, the tailgates of vehicles. The special feature of the gas spring lies in that two opening angle regions are predetermined. In a first opening angle region, the gas spring, because of the compressive force acting on the cross section of the piston rod, extends automatically until the piston has reached the end of a bypass groove that connects the two working chambers which are separated by the piston.

In the region of the second opening angle region, fluid exchange is influenced by a pressure-control valve that consists of a helical spring and a valve seal. In use, the pressure-control valve can be opened by an additional external force, the manual force of the user, whereby the gate can be moved into the second opening angle region.

As soon as the gate is released, the valve seal, biased by the spring, opens a valve aperture. The gas cushion confined in the working chamber remote from the piston rod holds the gate in the desired position in the second opening angle region. If the gate is to be moved further, manual force is again required.

A basic problem, which is common to all gas springs, is that the extension force is highly temperature-dependent. There are many possible solutions to this problem. One possibility, for example, is to maintain the temperature of the gas in the gas spring at a desired value by electric heating. DE 4,421,773 A1 describes such a system. A fundamental disadvantage is that the expenditure for equipment and input of energy are of course considerable.

U.S. Pat. No. 5,404,972 describes a self-blocking gas spring with a temperature-dependent bypass valve. The temperature-dependent bypass valve contains a bimetallic spring whose elastic force increases with decreasing temperature and, in so doing, prestresses a valve in the direction of closing. Depending upon the temperature, the valve is opened progressively by the operating pressure in the working chamber on the piston-rod side in order to keep the push-out force of the gas spring as constant as possible.

SUMMARY OF THE INVENTION

An object of the present invention is to provide a piston-cylinder unit in the structural form of a gas spring having at least two opening regions in such a way that the holding force of the gas spring is independent of temperature in the region in which the extending motion of the piston rod is released or continued by hand.

According to the present invention, the foregoing object is accomplished in that the spring of the pressure-control valve has a temperature-dependent elastic force which increases with increasing operating temperature, as a result of which the compressive force necessary to open the pressure-control valve increases correspondingly. The higher the temperature, the greater the compressive force in the direction of opening of the pressure valve. But the compressive force acting in the direction of extension of the piston rod also increases to an equal extent. Consequently, active compression and elastic forces act in the same direction, so that any manual force necessary in operation remains substantially constant and, above all, the holding force of the gas spring likewise becomes constant, independent of temperature. In the prior art, it had to be ensured that a sufficient holding force was available in the intermediate stop position even at high operating temperatures, with the result that a large manual force was required for overcoming the intermediate stop position at low temperatures. With the arrangement according to the invention, this problem no longer arises.

With a view to a simple and inexpensive structure, the temperature-dependent spring is a bimetallic spring. External energy or control devices are not needed, since skillful design of the components permits temperature and hence force compensation to be present in the usual temperature range between −40° C. and 80°.

In advantageous embodiments, the piston has a sleeve section with a base, the base having a passage which is capable of being blocked by the valve body of the pressure-control valve. A valve seat is simple to manufacture. The sleeve section in the piston has a sealing piece on which the spring of the pressure-control valve is supported. Thus, the sleeve section forms a housing for the pressure-control valve. The piston can be readily assembled, particularly when the pressure-control valve and the sealing piece are arranged in the axial direction of the piston-cylinder unit.

The spring of the pressure-control valve, like other components of the piston-cylinder unit, is frequently subjected to comparatively strong vibrations, particularly in a motor vehicle. In addition, temperature changes may produce extensions in length, which alter the position of the spring. To secure the assembly position of the spring of the pressure-control valve, the sealing piece has a slot-like guide.

Since the spring has an essentially U-shaped cross section, the sealing piece provides an additional guide surface, in the direction of the arm, for an arm of the spring which bears the valve body. The freedom of motion of the spring is thus limited to one axis.

In addition, the slot-like guide has a stop surface, on which the arm of the spring comes to rest at extremely low temperatures. The U-shaped spring is to be prevented from bending so much that the valve body falls out of its intended position.

In order to obtain as short and direct a fluid flow as possible, the sealing piece has a fluid connection to the working chamber remote from the piston rod.

It is possible also for the sealing piece to have a sealing plate which provides a stop surface for a spring damper that arrests the movement of the piston near the fully retracted position of the gas spring.

To simplify manufacture of the piston, the piston is accepted by a pin of the piston rod and fastened there. The receiving aperture in the piston has a section which provides a valve antechamber for the pressure-control valve. The added expense of a separate valve antechamber is avoided. The connection between the piston and the piston pin need not even be pressure-tight, since a little leakage has no effect on the operating behavior of the piston-cylinder unit.

DESCRIPTION OF THE DRAWINGS

The invention and its advantages may be more fully understood by reference to the following description, taken in conjunction with the accompanying drawings.

FIG. 1 is a side view of the rear portion of a vehicle in which a gas spring is used to assist in opening and holding open a vehicle tailgate;

FIG. 2 is a side cross-sectional view of an embodiment of the piston-cylinder unit;

FIG. 3 is a detailed side cross-sectional view of the piston of a piston-cylinder unit;

FIGS. 4a, 4b and 4c are a side, a front and a top view of the sealing piece of the piston of FIG. 3; and FIG. 5 is a force diagram of a piston-cylinder unit according to the invention.

DESCRIPTION OF EMBODIMENTS

FIG. 1 shows an exemplary application of a piston-cylinder unit 1 in the structural form of a gas spring (hereinafter called "gas spring 1") to a tailgate 3 of a motor vehicle 5. The tailgate has at least one opening angle region $\alpha_1$ through which, because of the gas spring extension force $F_{Gas}$, the tailgate 3 is automatically moved independently of any manual force $F_{Hand}$. The gate stops at the end of the first opening angle region. The purpose of this measure, on the one hand, is to prevent the tailgate from striking the garage roof in low garages or to permit a person short in stature to be able to reach the handle to close the tailgate. For tall persons, it is possible, by the use of manual force $F_{Hand}$ in a second opening angle position, for the tailgate to be opened further to a desired opening angle. The design may, alternatively, be such that the second opening angle region is designed as a simple intermediate stop at a holding point, and an additional opening region follows, in which the gas spring again executes an extension motion automatically with the application of a manual force only to move the tailgate past the holding point.

Referring to FIG. 2, the gas spring 1 consists of a cylinder 7 having an end wall 9. An open end of the cylinder receives a piston-rod guide seal assembly 11, which supports a piston rod 13 for axial movement and forms a seal between the piston rod and the cylinder. To the piston rod is fastened a piston 15, which divides the cylinder 7 into two working chambers 17 and 19 and has two valves. A one-way valve 21 consists of a piston ring 23, which is received for axial movement in a piston-ring groove 25 and is in frictional contact with the inner surface of the cylinder 7. Depending upon the position of the ring 23 within the piston ring groove, a flow connection 27 between the working chambers is open or closed. If the piston ring engages an upper side wall 29 of the groove, the flow connection is opened, whereas when it engages on the lower side wall 31 of the groove the connection is closed.

The second valve of the piston is a pressure-control valve 33, which consists of a closable valve passage $D_B$ (see FIG. 3) and a valve body 37, which is biased by a compression spring 35 to a position closing the passage $D_B$. The compression spring is a bimetallic spring which, with increasing temperature of the gas in the cylinder, exerts a greater elastic force $F_{Feder}$.

In a first longitudinal section of the cylinder 7, a bypass groove 39 whose length is proportional to the angle of opening $\alpha_1$ (see FIG. 1) is formed in the inner wall. The gas pressure in the cylinder, which acts on the cross section of the piston rod 13 of diameter $D_K$, allows the piston rod, independently of the switch position of the two valves 29 and 33, to extend until the end of the bypass groove 39 is reached. At that point the piston rod stops, since the flow connection through the bypass groove 39 is interrupted and the one-way valve 29 is closed, since (1) the piston ring 23 comes to rest on the lower side wall of the groove after a motion of extension because of the effective frictional force between the piston ring and the inner surface of the cylinder and (2) the valve body 37 is biased by the spring 35 into a position blocking flow through the valve passage $D_B$.

For the continued motion of extension of the gas spring, the piston rod is extended from the cylinder by an additional manual force on the gate, whereby the pressure-control valve 33 is opened because of the build-up of pressure in the working chamber 17. An additional bypass groove 43, which allows the gas spring to extend automatically as within the first bypass groove, is connected to a groove-free section 41.

When the gas spring is subjected to an external force tending to push the piston rod into the cylinder, the piston ring 23, because of frictional force, is moved relative to the piston into engagement with the upper side wall 29 of the groove, thus releasing the flow connection 27. Fluid exchange between the two working chambers 17, 19 is able to take place, and the piston rod can be retracted.

FIG. 3 shows the piston 15 on the piston rod 13 as a separate piece where, unlike FIG. 2, a compression spring 35 arranged in axial direction is used. The design decision with regard to the alignment of the compression spring radially or axially is dependent upon the diameter of the cylinder 7.

As can be seen, the piston 15 of FIG. 3 consists of a main part with a sleeve section 45, which extends from a base 47. The passage $D_B$, which is capable of being blocked by the valve body 37, is provided in the base 47. The main part of the piston has a receiving aperture into which a piston-rod pin 49 can be inserted. A neck 51 is formed on the piston-rod pin, so that the wall forming the receiving aperture can be partially pressed into the neck, thereby producing a form-locking connection. The receiving aperture is deeper than the insertion depth of the piston-rod pin, so that between the base 47 and the face of the piston-rod pin a valve antechamber 52 is present, which communicates the passage $D_B$ through the radial passage 53 with the piston-ring groove 25.

A sealing piece 55, which is likewise fastened to the piston by way of a form-locking connection, is received in the sleeve section 45 of the piston 15. A part of the sealing piece is a sealing plate 57, on which there is provided a holding pin 59 for affixation of the lower arm 35a of the U-shaped compression spring 35. The vertical arm 35b rests on the sleeve section 45—note that the compression spring consists of a flat band material and the sleeve section is cylindrical, so that only the side edges of the spring engage the sleeve section and the apparent distance between the vertical arm 35b and the sleeve section 45 is only the result of pictorial representation.

With reference next to FIGS. 4a to 4c, the sealing piece 55 has an essentially semicircular centering section 61, whose upper sealing surface 63 rests on the base 47. The centering section, in the region of the upper transverse arm 35c of the compression spring 35 (see FIG. 3), has a slot-shaped recess 65, a first guide surface 67 of which guides the transverse arm 35c of the compression spring radially. In addition, side walls 69 and 71 provide guidance of the compression spring in the transverse direction. A stop surface 73 ensures that the compression spring, at extremely low temperatures, does not move too far inward and allow the valve body to fall out from between the compression spring 35 and the base 47.

As already described with reference to FIG. 2, fluid flows through the piston through the pressure-control valve 33. It can be seen in FIG. 3 that fluid is able to flow into the sleeve section. Between the sleeve section and the working chamber distant from the piston rod, at least one fluid connection 75 (FIG. 4c) is present in the region of the sealing plate 57. The sealing piece may be produced by molding, for example. The fluid connections 75 therefore are provided at the edge of the sealing plate to facilitate removal of the piece from the mold. In addition, the massive sealing plate is also suitable as a stop for a damper spring 77 (see FIG. 2) in the lower working chamber of the gas spring.

FIG. 5 depicts the operating behavior of the gas spring. The diagram consists of a horizontal axis, on which the piston rod stroke s is plotted. The vertical axis indicates the magnitude of the force F which is exerted by the gas spring during the piston-rod stroke s. Point P1 corresponds to the extended piston rod, which starting from P1 is retracted to Point 2. From P3, the piston rod extends again, while the difference in force between Points P2 and P3 is to be accounted for by, inter alia, the friction within the gas spring. P4 is reached at the upper discharge of the bypass groove 39. Fluid exchange between the working chambers 17 and 19 is still able to take place at Point 4, whereas at P5 the on-off valve 21 and the pressure-control valve 33 are closed. A greater pressure is established in the upper working chamber 17 than in the lower working chamber 19. The pressure difference $\Delta p$ between the working chambers 17 and 19 is calculated as follows:

$$\Delta p = F_{Feder}/((\pi/4) \times D_B^2), \quad (1)$$

where
$F_{Feder}$=force of the spring 35 in the pressure-control valve 33
$D_B$=diameter of the passage in the pressure-control valve 33

The reduced push-out force $F_{red}$ between Point 4 and Point 5 may be calculated from the pressure difference $\Delta p$.

$$F_{red} = \Delta p \times \pi/4 \times (D_{zy1}^2 - D_K^2), \quad (2)$$

where
$D_{zy1}$=inside diameter of the cylinder 7 of the gas spring
$D_K$=diameter of the piston rod 13

If $\Delta p$ in Equation (2) is replaced by the contents of Equation (1), one obtains:

$$F_{red} = F_{Feder} \times ((D_{zy1}^2 - D_K^2)/D_B^2) \quad (3)$$

In addition, $$F_{red} = F_{Gas} - F_{Aus} \quad (4)$$

applies for the relationship between reduced push-out force $F_{red}$, push-out force $F_{Aus}$ with valves 21 and 33 closed and push-out force $F_{Gas}$ with valves 21 and 33 open (see FIG. 5).

When Equations (3) and (4) are solved, the relation:

$$F_{Feder} \times ((D_{zy1}^2 - D_K^2)/D_B^2) = F_{Gas} - F_{Aus} \quad (5)$$

is obtained.

If the forces on the gate with valves 21 and 33 closed are considered, the following condition of equilibrium is produced:

$$F_{Aus} = F_G - F_{hand}, \quad (6)$$

where
$F_G$=Equilibrium force of, for example, the gate of the vehicle
$F_{Hand}$=Manual force for overcoming the stop position of the gas spring.

If the term $F_{Aus}$ in Equation (5) is replaced by the contents of Equation (6), $$F_{Feder} \times ((D_{zy1}^2 - D_K^2)/D_B^2) = F_{GaS} - F_G + F_{Hand} \quad (7)$$

is obtained.

The magnitudes $F_{Feder}$ and $F_{Gas}$ are temperature-dependent, in the sense that the two forces increase or decrease proportionally. The equilibrium force $F_G$ is a constant in Equation (7). Consequently, the manual force $F_{Hand}$ is also constant.

What is claimed is:

1. A gas spring, comprising:
    a cylinder containing a fluid, at least part of which is a compressed gas;
    a piston affixed to a piston rod, said piston being received in the cylinder and dividing the cylinder into two working chambers;
    the piston having a one-way valve responsive to the direction of motion of the piston in the cylinder and a pressure-control valve comprising a spring and a valve body arranged in parallel with the one-way valve;
    the piston having a sleeve section and a base, and the base having a passage which is blocked by the valve body of the pressure-control valve when the pressure-control valve is closed;
    the sleeve section of the piston having a sealing piece on which a portion of the spring of the pressure-control valve is supported;
    the sealing piece having a fluid connection to the working chamber remote from the piston rod;
    a bypass in a first stroke region of the piston which allows fluid flow past the one-way valve and the pressure-control valve, the first stroke region being adjoined by a bypass-free stroke region, the gas spring being arrested in the bypass-free stroke region;
    the spring of the pressure-control valve exerting a temperature-dependent elastic force, the elastic force being greater with increasing operating temperatures;
    whereby the compressive force necessary for opening the pressure-control valve increases in correspondence with increases in operating temperatures of the gas spring.

2. A gas spring, comprising:
    a cylinder containing a fluid, at least part of which is a compressed gas;
    a piston affixed to a piston rod, said piston being received in the cylinder and dividing the cylinder into two working chambers;
    the piston having a one-way valve responsive to the direction of motion of the piston in the cylinder and a pressure-control valve comprising a spring and a valve body arranged in parallel with the one-way valve;
    the piston being received on a pin of the piston rod and fastened thereto, and a portion of an aperture in the piston that receives the pin of the piston being a valve antechamber for the pressure-control valve;
    a bypass in a first stroke region of the piston which allows fluid flow past the one-way valve and the pressure-control valve, the first stroke region being adjoined by a bypass-free stroke region, the gas spring being arrested in the bypass-free stroke region;
    the spring of the pressure-control valve exerting a temperature-dependent elastic force, the elastic force being greater with increasing operating temperatures;
    whereby the compressive force necessary for opening the pressure-control valve increases in correspondence with increases in operating temperatures of the gas spring.

3. A gas spring, comprising:

a cylinder containing a fluid, at least part of which is a compressed gas;

a piston affixed to a piston rod, said piston being received in the cylinder and dividing the cylinder into two working chambers;

the piston having a one-way valve responsive to the direction of motion of the piston in the cylinder and a pressure-control valve comprising a spring and a valve body arranged in parallel with the one-way valve;

the piston having a sleeve section and a base, and the base having a passage which is blocked by the valve body of the pressure-control valve when the pressure-control valve is closed;

the sleeve section of the piston having a sealing piece on which a portion of the spring of the pressure-control valve is supported;

the sealing piece having a slot-shaped guide for an arm portion of the spring of the pressure-control valve;

the slot-shaped guide having a stop surface on which, at extremely low temperatures, the arm portion of the spring comes to rest;

a bypass in a first stroke region of the piston which allows fluid flow past the one-way valve and the pressure-control valve, the first stroke region being adjoined by a bypass-free stroke region, the gas spring being arrested in the bypass-free stroke region;

the spring of the pressure-control valve exerting a temperature-dependent elastic force, the elastic force being greater with increasing operating temperatures;

whereby the compressive force necessary for opening the pressure-control valve increases in correspondence with increases in operating temperatures of the gas spring.

4. The improvement according to claim 3, wherein the temperature-dependent spring is a bimetallic spring.

5. The improvement according to claim 3, wherein the spring has an essentially U-shaped cross section, and the sealing piece includes a guide surface for the arm portion of the spring that bears on the valve body.

6. The improvement according to claim 3, wherein the sealing piece has a sealing plate which provides a stop surface for a spring damper.

* * * * *